United States Patent
O'Hara et al.

(10) Patent No.: US 11,993,188 B2
(45) Date of Patent: May 28, 2024

(54) ADJUSTABLE BED FOR A VEHICLE

(71) Applicant: Gulfstream Aerospace Corporation, Savannah, GA (US)

(72) Inventors: Timothy O'Hara, Savannah, GA (US); Kevin Sethapun, Savannah, GA (US); Salvador Gonzalez, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 769 days.

(21) Appl. No.: 16/949,122

(22) Filed: Oct. 14, 2020

(65) Prior Publication Data
US 2021/0114499 A1 Apr. 22, 2021

Related U.S. Application Data

(60) Provisional application No. 62/923,001, filed on Oct. 18, 2019.

(51) Int. Cl.
*B60Q 3/76* (2017.01)
*A47C 17/52* (2006.01)
(Continued)

(52) U.S. Cl.
CPC .............. *B60N 3/008* (2013.01); *A47C 20/04* (2013.01); *B60N 3/001* (2013.01); *B60Q 3/76* (2017.02);
(Continued)

(58) Field of Classification Search
CPC ......... B60N 3/008; A47C 20/04; A47C 17/80; A47C 17/86; B64D 2011/0069; B64D 11/06395; B60Q 3/76
(Continued)

(56) References Cited

U.S. PATENT DOCUMENTS 1,073,674 A * 9/1913 Giordano ............... A47B 81/00
49/176
D45,708 S * 5/1914 Giordano ............................ 5/58
(Continued)

FOREIGN PATENT DOCUMENTS

EP 0980826 A2 2/2000
EP 0980826 A3 6/2000
(Continued)

OTHER PUBLICATIONS

Translation of KR 2018121755 A. (Year: 2018).*
Translation of KR 2019052468 A. (Year: 2019).*

*Primary Examiner* — Justin C Mikowski
*Assistant Examiner* — Alison N Labarge
(74) *Attorney, Agent, or Firm* — Lorenz & Kopf, LLP

(57) ABSTRACT

An adjustable bed assembly for a vehicle includes a contoured bed frame, a foundation disposed in the bed frame and coupled to an articulated frame having a support platform with a plurality of sectional support members. A linkage mechanism couples the support platform to the foundation and a drive mechanism operably coupled to the linkage assembly adjusts the position of at least one sectional support member. A mattress is disposed on the support platform and configured to conform with the plurality of sectional support members. A monitor mounted on the bed frame is movable between a retracted position and an extended position. A control device has a first preset for concurrently adjusting the articulated frame and moving the monitor.

16 Claims, 5 Drawing Sheets

(51) Int. Cl.
*A47C 20/04* (2006.01)
*B60N 3/00* (2006.01)
*B60Q 3/82* (2017.01)
*B60R 7/04* (2006.01)
*B60R 11/02* (2006.01)
*B60R 11/00* (2006.01)
*B64D 11/00* (2006.01)

(52) U.S. Cl.
CPC ............... *B60Q 3/82* (2017.02); *B60R 7/04* (2013.01); *B60R 11/0235* (2013.01); *A47C 17/52* (2013.01); *B60R 2011/0003* (2013.01); *B60R 2011/0082* (2013.01); *B64D 11/003* (2013.01); *B64D 2011/0053* (2013.01); *B64D 2011/0069* (2013.01)

(58) Field of Classification Search
USPC ............................................................ 5/308
See application file for complete search history.

(56) References Cited

U.S. PATENT DOCUMENTS

| | | | | |
|---|---|---|---|---|
| 1,297,144 | A * | 3/1919 | Giordano | A47C 19/22 5/2.1 |
| 1,338,741 | A * | 5/1920 | Lipshitz | A47C 19/22 5/200.1 |
| 2,501,309 | A * | 3/1950 | Braver | A47B 83/00 5/93.1 |
| 2,662,231 | A * | 12/1953 | King | A47D 7/007 5/2.1 |
| 2,787,007 | A * | 4/1957 | Erdkamp | A47D 7/007 5/2.1 |
| 4,259,755 | A * | 4/1981 | Hollander | A47C 13/005 5/2.1 |
| 4,573,225 | A * | 3/1986 | Wolf | A47C 17/86 5/118 |
| 4,780,919 | A * | 11/1988 | Harrison | A61G 7/05 5/604 |
| 5,067,183 | A * | 11/1991 | Urquiola | A47D 11/005 5/2.1 |
| 5,216,769 | A * | 6/1993 | Eakin | A47C 21/003 5/174 |
| 10,111,530 | B1 * | 10/2018 | Kramer | A47C 19/02 |
| 10,315,770 | B2 | 6/2019 | Bunea et al. | |
| 2002/0124311 | A1 * | 9/2002 | Peftoulidis | A47C 17/86 5/400 |
| 2003/0159214 | A1 * | 8/2003 | Kurtz | A47C 17/86 5/503.1 |
| 2005/0011005 | A1 * | 1/2005 | Borda | A47C 19/04 5/400 |
| 2006/0022087 | A1 | 2/2006 | Crocco et al. | |
| 2007/0262625 | A1 | 11/2007 | Dryburgh et al. | |
| 2016/0206113 | A1 * | 7/2016 | Rawls-Meehan | A47C 20/048 |
| 2017/0282755 | A1 | 10/2017 | Gordiet | |
| 2018/0290753 | A1 | 10/2018 | Gledich | |
| 2019/0290012 | A1 * | 9/2019 | Heeke | A47C 21/06 |
| 2019/0328593 | A1 * | 10/2019 | Choi | A61G 7/018 |
| 2020/0214460 | A1 * | 7/2020 | Wang | A47C 21/006 |
| 2020/0367660 | A1 * | 11/2020 | Tsai | A47C 20/04 |
| 2021/0052085 | A1 * | 2/2021 | Wang | A47C 31/005 |
| 2021/0120963 | A1 * | 4/2021 | Lin | A47C 20/04 |

FOREIGN PATENT DOCUMENTS

| | | | | |
|---|---|---|---|---|
| EP | 2380463 | A1 * | 10/2011 | ............ A47C 20/04 |
| EP | 2918255 | A1 | 9/2015 | |
| KR | 2018121755 | A * | 11/2018 | ............ A47C 17/80 |
| KR | 2019052468 | A * | 5/2019 | ............ A47C 20/04 |
| WO | 2006021766 | A1 | 3/2006 | |

* cited by examiner

ADJUSTABLE BED FOR A VEHICLE

CROSS-REFERENCE TO RELATED APPLICATIONS

This application claims the benefit of U.S. Provisional Application No. 62/923,001, filed on Oct. 18, 2019. The entire disclosure of the above application is incorporated herein by reference.

TECHNICAL FIELD

The present disclosure relates generally to an interior fixture in a vehicle, and more particularly relates to an adjustable bed having programable modes for adjusting the position of the bed and associated component in a plurality of configurations based on a user's preference.

BACKGROUND

This section provides background information related to the present disclosure which is not necessarily prior art.

Providing an adaptable interior configuration with various functions and features is of interest for many vehicle manufacturers. For example, in an aircraft, it is desirable to provide a sleeping arrangement that is adjustable such that a passenger may configure the sleeping arrangement for relaxation or for sleeping.

Accordingly, it is desirable to provide an adjustable bed having preset modes that are programmable by the user that addresses one or more of the foregoing issues. Furthermore, other desirable features and characteristics of the various embodiments described herein will become apparent from the subsequent detailed description and the appended claims, taken in conjunction with the accompanying drawings and this background.

SUMMARY

The present disclosure is directed to an adjustable bed assembly for a vehicle. The bed assembly includes a bed frame having a headboard, a sideboard and a footboard. A foundation is disposed in the bed frame and coupled to an articulated frame having a support platform with a plurality of sectional support members, a linkage assembly coupling the support platform to the foundation and a drive mechanism operably coupled to the linkage assembly for adjusting the position of at least one sectional support member between a first position and a second position. A mattress is disposed on the support platform and configured to conform with the plurality of sectional support members in the first and second positions. A control device is configured to operate the articulated frame, a monitor mounted on the footboard and a reading lamp mounted on the headboard. The control device has a first preset for adjusting the articulated frame in the first position, switching the monitor off and switching the reading lamp off and a second preset for adjusting the articulated frame in the second position, and switching at least one of the monitor and the reading lamp on.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
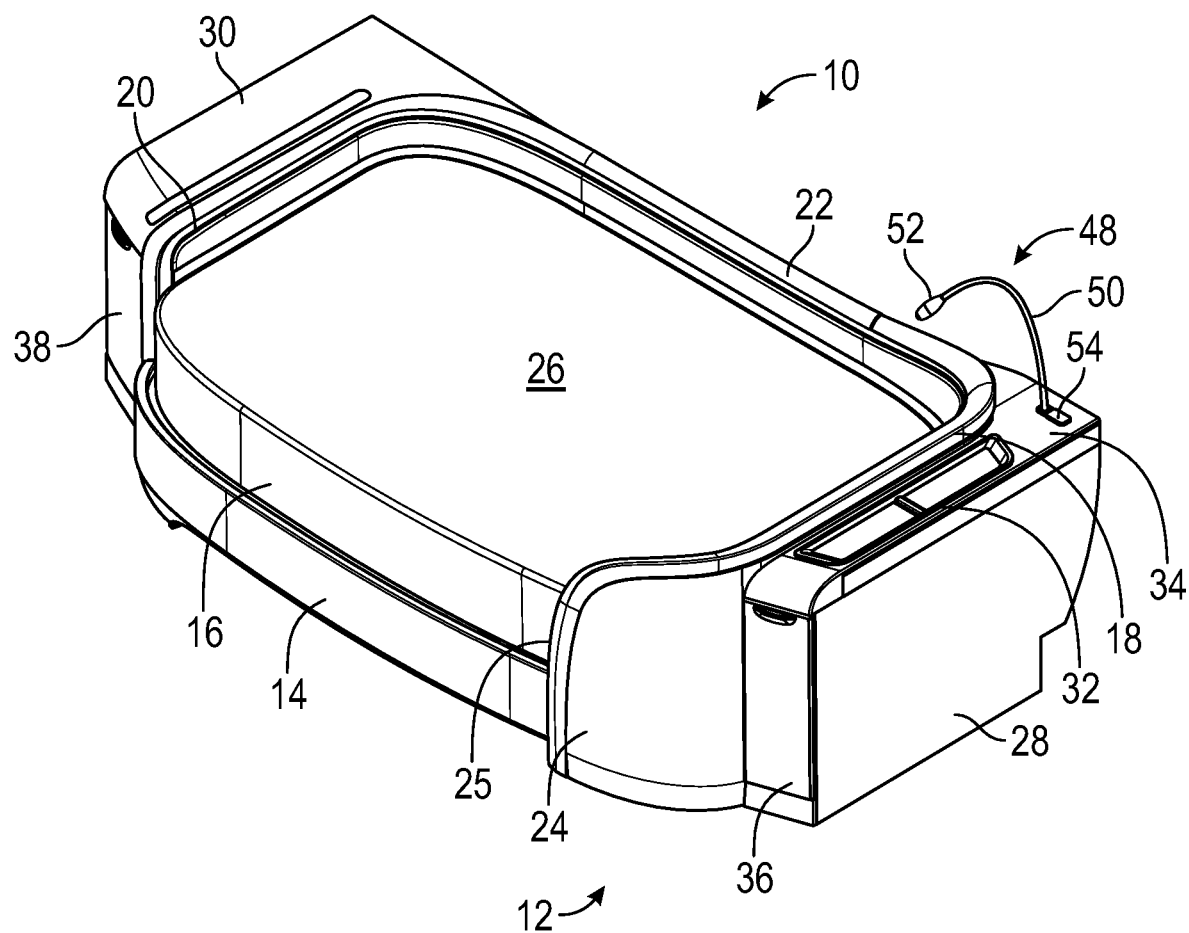
FIG. 1 is a perspective view of an adjustable bed.

The following Detailed Description is merely exemplary in nature and is not intended to limit the various embodiments or the application and uses thereof. Furthermore, there is no intention to be bound by any theory presented in the preceding background or the following With reference to FIGS. 1-5, an exemplary embodiment described herein provides an adjustable bed assembly 10 including a contoured bed frame 12, a foundation 14 and a mattress 16. The contoured bed frame 12 has a headboard 18, a footboard 20, a first sideboard 22 extending along the mattress 16 on a first side from the headboard 18 to the footboard 20 and a second sideboard 24 extending along a portion (approximately 20%) of the mattress 16 from the headboard 18 and terminating at a free edge 25. As best seen in FIG. 1, the headboard 18, the footboard 20 and sideboards 22, 24 extend vertically above the sleeping surface 26 of the mattress 16 to surround the sleeping surface 26 on three sides of the mattress 16 and to partially surround the sleeping surface 26 on a fourth side of the mattress 16. In this way, the contoured bed frame 12 provides easy ingress and egress to the sleeping surface 26, while substantially enveloping a user occupying the bed assembly 10, i.e., an occupant.

The contoured bed frame 12 may optionally include integrated night stands 28, 30. For example, a first nightstand 28 may extend from the headboard 18 away from the mattress 16. In one embodiment, the nightstand 28 has a recessed storage area 32 in the top surface 34 for placing various items such as personal belongings, electronics (e.g., a clock), food and beverages, etc. in a readily accessible location proximate the mattress 16. The nightstand 28 may also include a storage compartment 36 in the form of a cabinet or drawer to provide concealed storage for various items. A second nightstand 30 may extend from the footboard 20 away from the mattress 16. In one embodiment, the nightstand 30 includes a storage compartment 38 in the form of a cabinet or drawer to provide concealed storage for various items.

As indicated above, the bed assembly 10 is adjustable in that the sleeping surface 26 may be adjusted into various comfort positions. In particular, the bed assembly 10 includes an articulated frame 40 within the foundation 14. The articulated frame 40 includes a sectional platform 42 supporting the mattress 16. In one embodiment, the sectional platform 42 includes four sectional members 42.1, 42.2, 42.3, 42.4 operably coupled together for rotating with respect to one another. In one embodiment, the first sectional member 42.1 supports the head, neck and shoulders of an occupant, the second sectional member 42.2 supports the torso and hips of the occupant, the third sectional member 42.3 supports the thighs of the occupant and the fourth sectional member 42.4 supports the lower legs and feet of the occupant. The articulated frame 40 includes a linkage mechanism 44 extending between the platform 42 and the foundation 14. In one embodiment, the linkage mechanism 44 includes a first linkage assembly 44.1 extending between the foundation 14 and the first section 42.1 and a second linkage assembly 44.2 extending between the foundation and the fourth section 42.4. The articulated frame 40 includes a drive mechanism 46 for selectively positioning the linkage mechanism 44 and thereby adjust the sectional platform 42. In one embodiment, the drive mechanism 46 includes a first drive 46.1 configured to move the first linkage assembly 44.1 for selectively positioning the first sectional member 42.1 and a second drive 46.2 configured to move the second linkage assembly 44.2 for selectively positioning the third and fourth sectional members 42.3, 42.4. The first and second drives 46.1, 46.2 may be independently operated for configuring the sectional platform 42 and hence the mattress 16 in an infinite number of positions.

Figure 2:
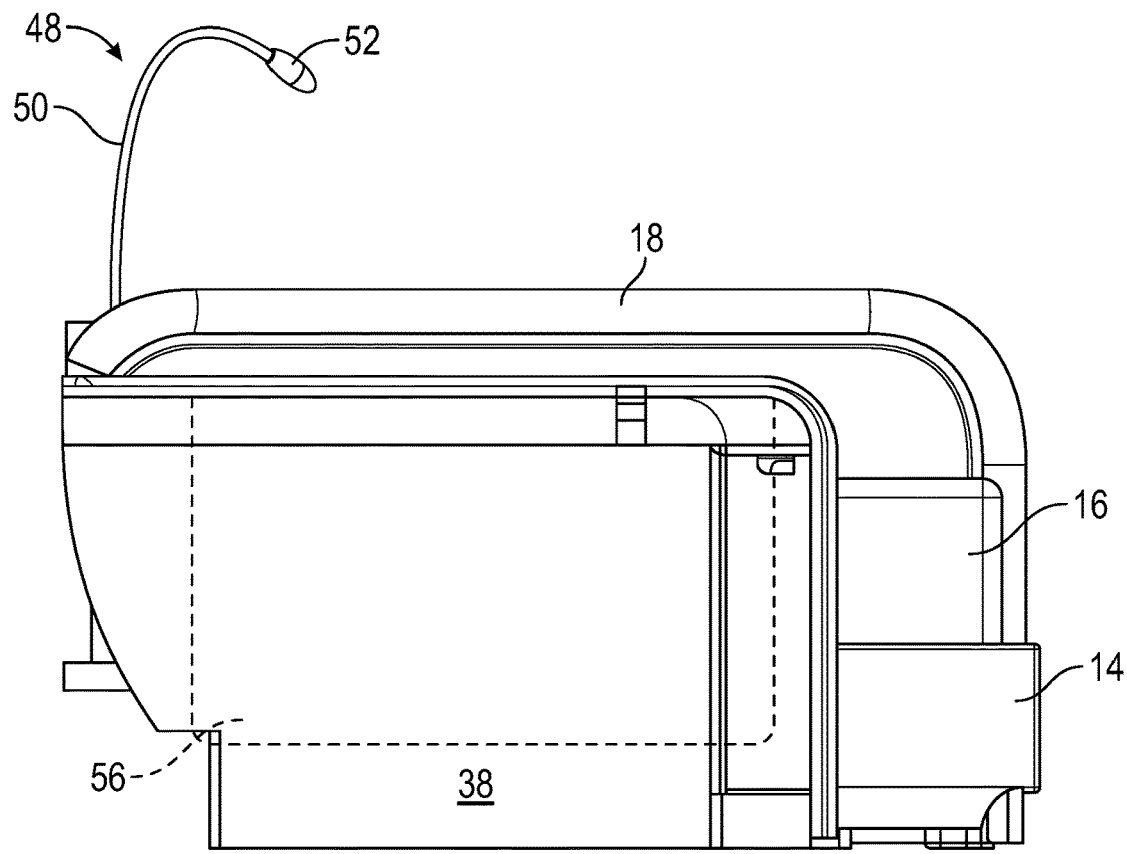
FIG. 2 is an end view of the adjustable bed configured in a first, sleeping mode.
Figure 3:
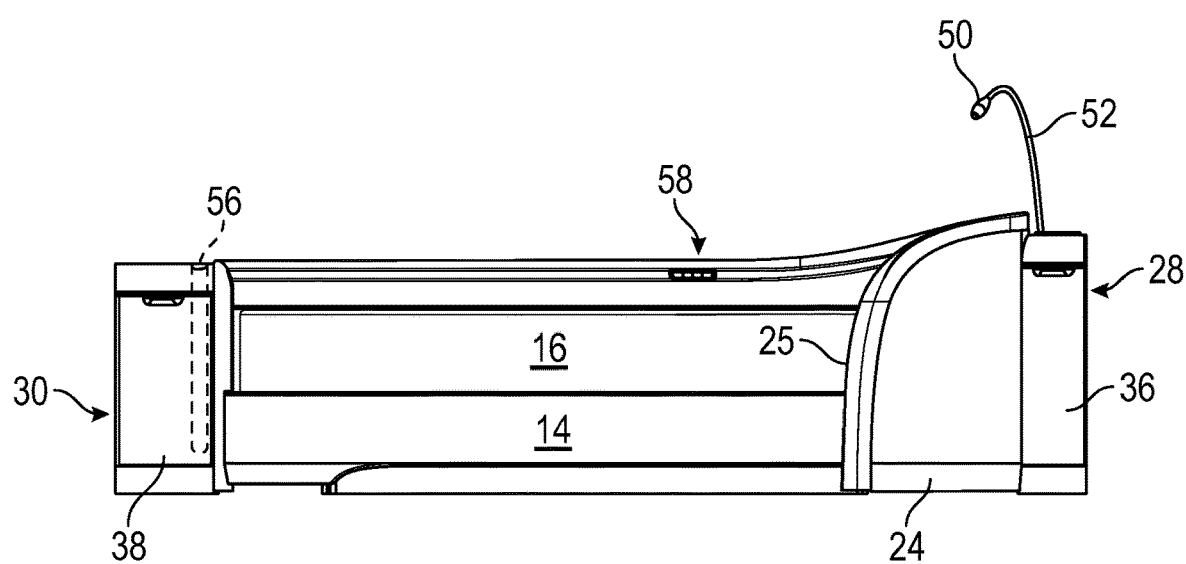
FIG. 3 is front view of the adjustable bed shown in FIG. 2.
Figure 4:
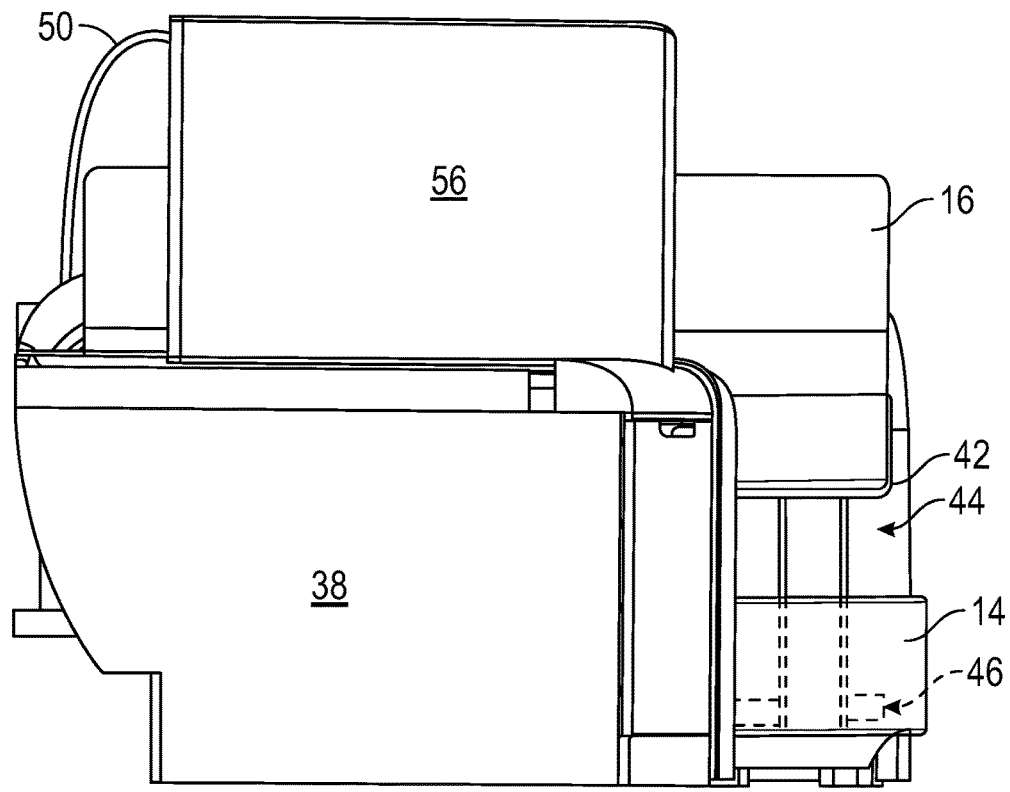
FIG. 4 is an end view of the adjustable bed configured in a second, relax mode.
Figure 5:
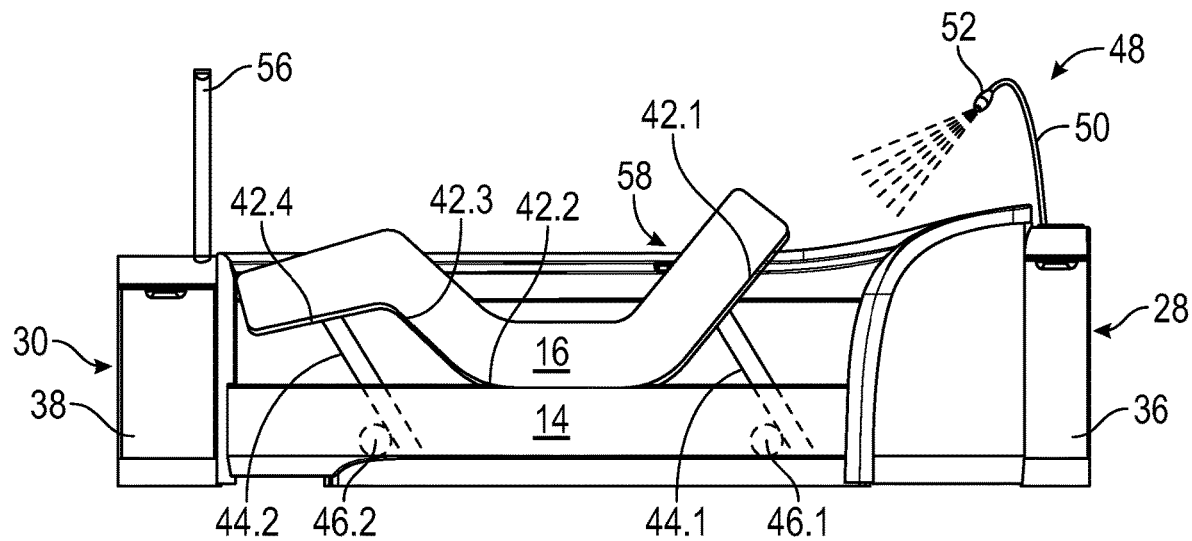
FIG. 5 is a front view of the adjustable bed shown in FIG. 4.
Figure 6:
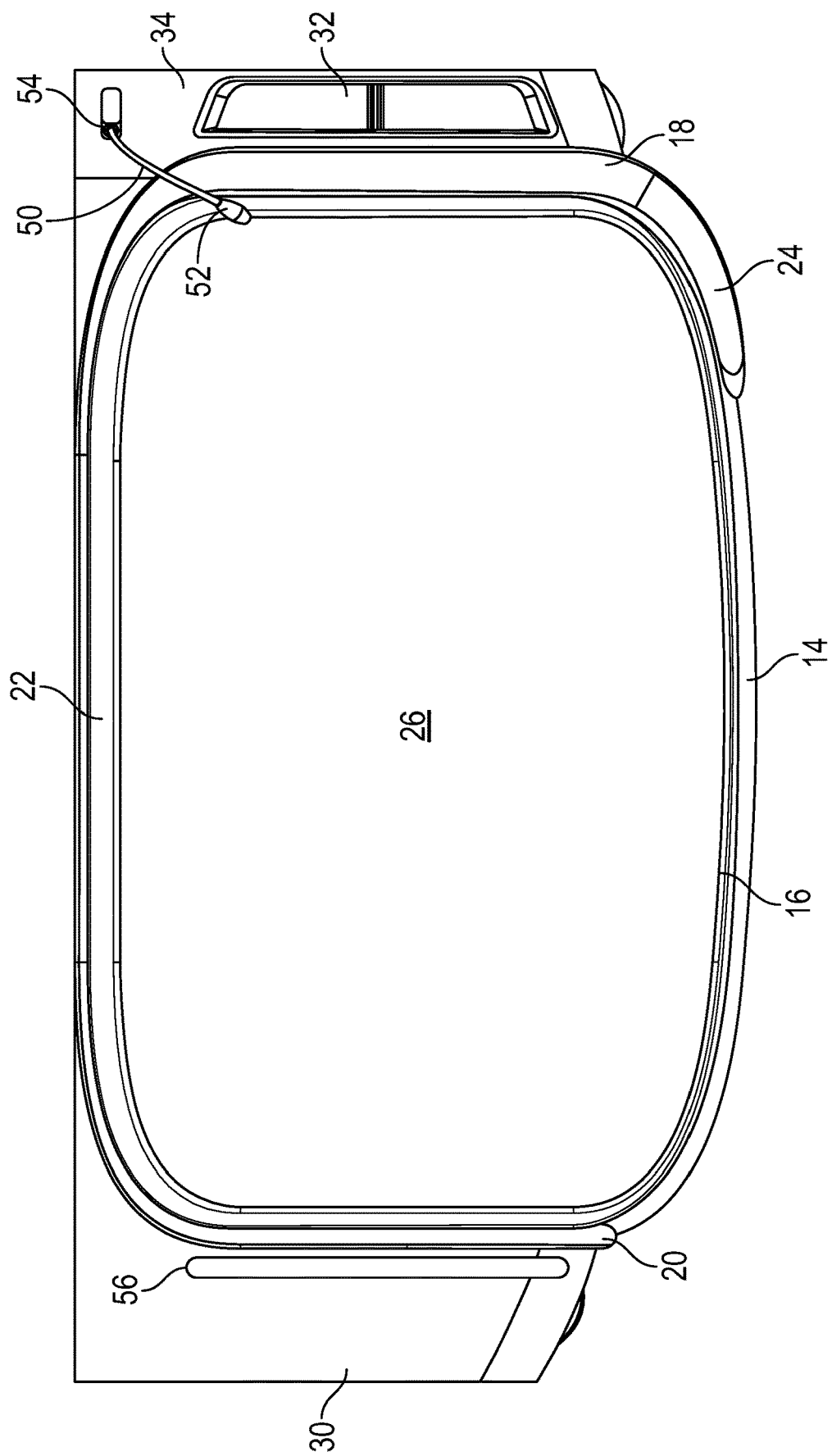
FIG. 6 is a top plan view of the adjustable bed.

The bed assembly 10 may include additional components or features to enhance the comfort and convenience for an occupant. The bed assembly 10 may include a reading lamp 48 to provide directed lighting toward the sleeping surface 26. In one embodiment, the reading lamp 48 includes a flexible neck 50 having a plug (not shown) on a first end 50.1 and a lamp 52 on a second end 50.2. A socket 54 is disposed in the first nightstand 28 of the bed assembly 10 and receives the plug for removably attaching the reading lamp 48 to the bed assembly 10 and powering the lamp 52. The bed assembly 10 may also include a monitor 56 to provide a display screen for the occupant. In one embodiment, the monitor 56 is mounted to the second nightstand 30 and movable between a retracted position such that the monitor 56 is stowed in the nightstand 30 as shown in FIGS. 2-3 and an extended position such that the monitor 56 is above the nightstand 30 at the foot of the mattress 16 as shown in FIGS. 4-5. The monitor 56 may be selectively coupled to a variety of audio-video sources such as a computer, DVD player, digital streaming device, etc. for providing display content to the monitor 56.

Figure 7:
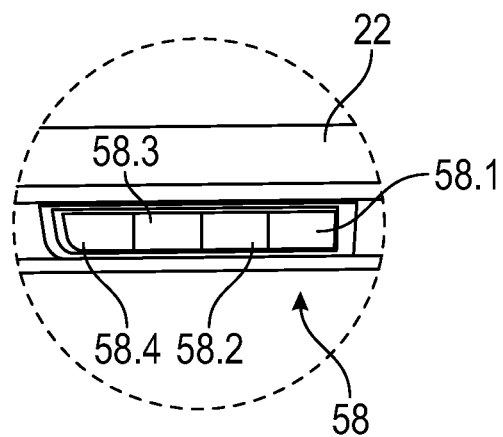
FIG. 7 is a detail of the control panel.

With reference now to FIGS. 3 and 7, the adjustable bed assembly 10 may also be configured with a control panel 58 located in the first sideboard 22 adjacent the sleeping surface 26 for operating the drive mechanism 46, the reading lamp 48 and/or the monitor 56. In one embodiment, the control panel 58 includes a plurality of buttons 58.1, 58.2, 58.3, 58.4 with each button assigned a specific function. For example, the first button 58.1 may be configured as an on-off switch for the reading lamp 48, the second and third buttons 58.2, 58.3 may be configured as preset modes for the bed assembly 10 and the fourth button 58.4 may be configured as an on-off switch for the monitor 56. In particular, the second button 58.2 may be configured as a sleep mode preset such that the push of a single button manipulates the articulated frame 40 into a flat sleeping position, the monitor is switch off and moved to the retracted position and the reading lamp 48 is switch off as shown in FIGS. 2-3. The third button 58.3 may be configured as a relax mode preset such that the push of a single button manipulates the articulated frame 40 into a reclined seated position, the monitor is moved to the extended position and switched on and the reading lamp 48 is also switched on.

Figure 8:
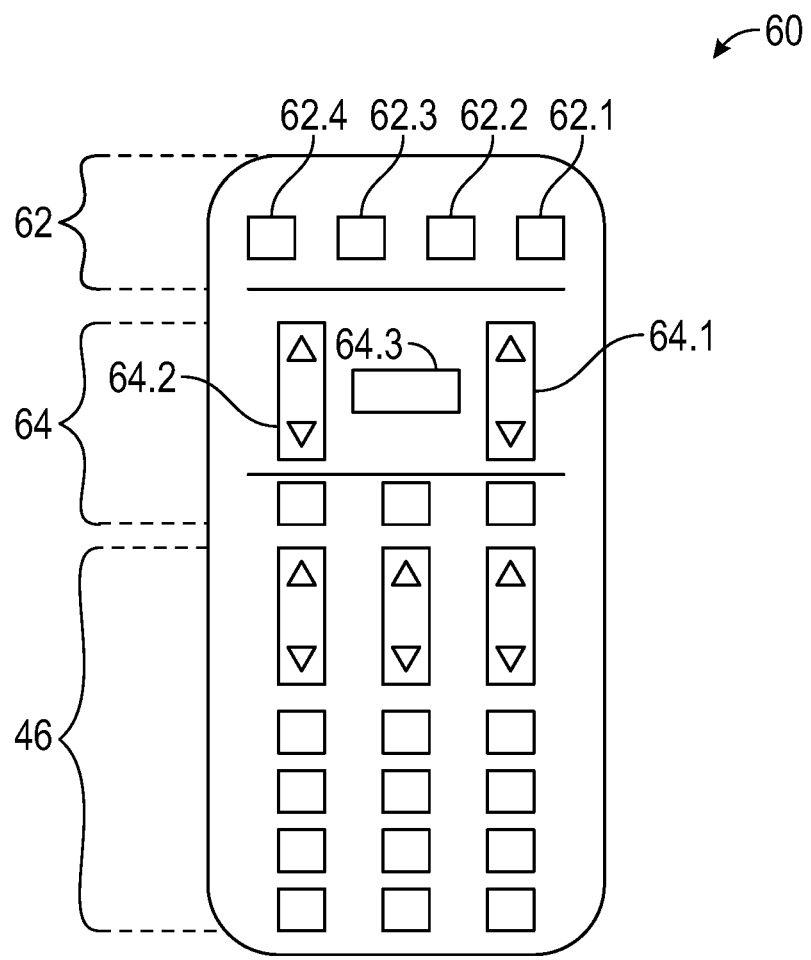
FIG. 8 is a schematic representation of a remote control device for programming and operating the adjustable bed and its associated components.

With reference now to FIG. 8, the adjustable bed assembly 10 may also include a remote control device which communicates with a microprocessor or other the control electronics (not shown) associated with the drive mechanism 46, the reading lamp 48 and the monitor 56. The remote control device may communicate over a wired connection with the control electronics or over a wireless communication interface. In one embodiment, a remote control device 60 includes a first section 62 with a plurality of buttons 62.1, 62.2, 62.3, 62.4, which mimic the buttons on control panel 58, a second section 64 for controlling the drive mechanism 46 to adjustable position the mattress, and a third section 66 for controlling the monitor 56. In particular, the second section 64 may include a first rocker switch 64.1 for moving the first linkage assembly 44.1 to adjust the first sectional member 42.1 and a second rocker switch 64.2 for moving the second linkage assembly 44.2 to adjust the third and fourth sectional members 42.3, 42.4. The second section 64 may also include a "set" or "learn" button 64.3 that may be used in conjunction with the mode buttons 58.2, 58.3 and 62.2, 62.3 to store the current configuration of the bed assembly as a preset mode. The third section 66 may include a plurality of buttons to remotely control the functions of a monitor or television including but not limited to home, input source, revert, volume up/down, monitor up/down, channel up/down, numeric keypad, etc. In another embodiment, the remote control device may be a conventional computer keyboard that communicates the microprocessor or other control electronics.

With reference now to all of the figures, the general operation of the adjustable bed assembly 10 will be described, with an understanding that the current state of the bed is in the sleep mode explained above. Using the remote control device 60, an occupant may adjust the sectional support members 42.1, 42.3, 42.4 to a desired position and also turn on/off the reading lamp 48 and/or the monitor 56 according to personal preferences. Once the bed assembly 10 is so adjusted, the occupant may simultaneously press the learn button 64.3 and one of the preset buttons (e.g., 58.2 or 62.2) to store the current state of the bed assembly 10 as a preset mode. Using the remote control device 60, the occupant may re-adjust the bed assembly 10 and simultaneously press the learn button 64.3 and another preset buttons (e.g., 58.3 or 62.3) to store this re-adjusted state. At this point, the occupant may simply press one of the preset buttons 58.2, 58.3, 62.2, 62.3 and the bed assembly 10 will automatically adjust to the programmed mode associate with the preset button that has been pushed.

While the adjustable bed assembly 10 is shown and described in combination with a reading lamp and a monitor, one skilled in the art should appreciate that applications and variations to the bed assembly are contemplated such that the detailed description is not intended to limit the scope, applicability, or configuration of the disclosure in any way. In this way, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:
1. An adjustable bed assembly for a vehicle comprising:
   a contoured bed frame including a headboard at a first end of the bed frame, a footboard at a second end of the bed frame opposite the first end, a first sideboard extending between the headboard and the footboard along a first side of the bed frame and a second sideboard extending from the headboard and terminating at a free edge on a second side of the bed frame;

a foundation disposed in the bed frame;
an articulated frame including a support platform with a plurality of sectional support members, a linkage mechanism coupling the support platform to the foundation and a drive mechanism operably coupled to the linkage assembly for adjusting the position of at least one sectional support member between a first position and a second position; and
a mattress disposed on the support platform and having a sleeping surface opposite the support platform, wherein the mattress is configured to conform with the plurality of sectional support members in the first and second positions; and
an integrated nightstand with a storage compartment extending from at least one of the headboard or the footboard, said storage compartment including a recessed storage area formed in a top surface of the integrated nightstand;
wherein the headboard, the footboard and the first and second sideboards extend vertically above the sleeping surface of the mattress.

2. The adjustable bed assembly according to claim 1, wherein the storage compartment comprises at least one of a cabinet or a drawer for providing concealed storage in the integrated nightstand.

3. The adjustable bed assembly according to claim 1, wherein the support platform comprises four sectional members operably coupled together for rotating with respect to one another.

4. The adjustable bed assembly according to claim 3, wherein the articulated frame comprises:
a first linkage assembly extending between the foundation and a first sectional member at the first end of the bed frame;
a first drive coupled to the first linkage assembly for selectively positioning the first sectional member;
a second linkage assembly extending between the foundation and a fourth sectional member at the second end of the bed frame, wherein a second sectional member and a third sectional member are disposed between the first and fourth sectional members; and
a second drive coupled to the second linkage assembly for selectively positioning the third and fourth sectional members.

5. The adjustable bed assembly according to claim 1, further comprising a control device configured to operate the articulated frame, wherein the control device has a first preset for adjusting the articulated frame in the first position and a second preset for adjusting the articulated frame in the second position.

6. The adjustable bed assembly according to claim 1, further comprising a monitor mounted on the footboard and a control devise operable to switch the monitor between an on state and an off state.

7. The adjustable bed assembly according to claim 6, wherein the monitor is movable relative to the footboard between a retracted position such that the monitor is concealed from the sleeping surface by the footboard and an extended position such that the monitor is above the footboard.

8. The adjustable bed assembly according to claim 1, further comprising a reading lamp electrically coupled to a socket formed in the headboard and a control device operable to switch the reading lamp between an on state and an off state, wherein the reading lamp is removably attached to the bed frame.

9. An adjustable bed assembly for a vehicle comprising:
a bed frame including a headboard at a first end of the bed frame, and a footboard at a second end of the bed frame opposite the first end;
a foundation disposed in the bed frame;
an articulated frame including a support platform with a plurality of sectional support members, a linkage assembly coupling the support platform to the foundation and a drive mechanism operably coupled to the linkage assembly for adjusting the position of at least one sectional support member between a first position and a second position;
a mattress disposed on the support platform and configured to conform with the plurality of sectional support members in the first and second positions;
an integrated nightstand with a storage compartment extending from at least one of the headboard or the footboard, said storage compartment including a recessed storage area formed in a top surface of the integrated nightstand; and
a monitor mounted at the second end of the bed frame and movable relative to the footboard between a retracted position such that the monitor is concealed from a sleeping surface of the mattress by the footboard and an extended position such that the monitor is above the footboard.

10. The adjustable bed assembly according to claim 9, wherein the bed frame further comprises a first sideboard extending between the headboard and the footboard along a first side of the bed frame and a second sideboard extending from the headboard and terminating at a free edge on a second side of the bed frame, wherein the headboard, the footboard and the first and second sideboards extend vertically above the sleeping surface of the mattress to form a contoured bed frame.

11. The adjustable bed assembly according to claim 9, further comprising a control device configured to concurrently operate the articulated frame and the monitor, wherein the control device has a first preset for adjusting the articulated frame in the first position, moving the monitor to the retracted position and switching the monitor off, and a second preset for adjusting the articulated frame in the second position, moving the monitor to the extended position and switching the monitor on.

12. The adjustable bed assembly according to claim 9, further comprising a reading lamp mounted on the headboard and switchable between an on state and an off state.

13. The adjustable bed assembly according to claim 12, further comprising a control device configured to concurrently operate the articulated frame, the monitor and the reading lamp, wherein the control device has a first preset for adjusting the articulated frame in the first position, moving the monitor to the retracted position and switching the monitor and the reading lamp off, and a second preset for adjusting the articulated frame in the second position, moving the monitor to the extended position and switching the monitor on.

14. The adjustable bed assembly according to claim 9, wherein the storage compartment comprises a recessed storage area formed in a top surface of the integrated nightstand.

15. The adjustable bed assembly according to claim 9, wherein the support platform comprises four sectional members operably coupled together for rotating with respect to one another.

16. The adjustable bed assembly according to claim 15, wherein the articulated frame comprises:

a first linkage assembly extending between the foundation and a first sectional member at the first end of the bed frame;

a first drive coupled to the first linkage assembly for selectively positioning the first sectional member;

a second linkage assembly extending between the foundation and a fourth sectional member at the second end of the bed frame, wherein a second sectional member and a third sectional member are disposed between the first and fourth sectional members; and a second drive coupled to the second linkage assembly for selectively positioning the third and fourth sectional members.

\* \* \* \* \*